(12) United States Patent
Knatt et al.

(10) Patent No.: US 11,936,489 B2
(45) Date of Patent: Mar. 19, 2024

(54) SYSTEMS, METHODS, AND APPLIANCES THAT ENABLE REGIONAL CONTROL OF REFRIGERATION APPLIANCES

(71) Applicant: True Manufacturing Company, Inc., O'Fallon, MO (US)

(72) Inventors: Kevin Knatt, St. Louis, MO (US); John Friend, St. Louis, MO (US)

(73) Assignee: TRUE MANUFACTURING CO., INC., O'Fallon, MO (US)

( * ) Notice: Subject to any disclaimer, the term of this patent is extended or adjusted under 35 U.S.C. 154(b) by 0 days.

(21) Appl. No.: 17/587,787

(22) Filed: Jan. 28, 2022

(65) Prior Publication Data

US 2022/0247593 A1    Aug. 4, 2022

Related U.S. Application Data

(60) Provisional application No. 63/144,665, filed on Feb. 2, 2021.

(51) Int. Cl.
*H04L 12/28* (2006.01)
*G01S 19/01* (2010.01)

(52) U.S. Cl.
CPC .......... *H04L 12/2818* (2013.01); *G01S 19/01* (2013.01); *H04L 12/2825* (2013.01); *H04L 12/2834* (2013.01); *H04L 2012/285* (2013.01)

(58) Field of Classification Search
CPC ............. H04L 12/2818; H04L 12/2825; H04L 12/2834; H04L 2012/285; H04L 67/12;
(Continued)

(56) References Cited

U.S. PATENT DOCUMENTS

| 5,801,632 A | 9/1998 | Opal |
| 6,060,987 A | 5/2000 | Marlia |

(Continued)

FOREIGN PATENT DOCUMENTS

| CN | 105066576 B | 5/2019 |
| EP | 3040658 B1 | 8/2020 |

(Continued)

OTHER PUBLICATIONS

Partial European Search Report for EP Application No. 22154817.5, dated Jul. 12, 2022, 14 pages.

(Continued)

*Primary Examiner* — Tejal Gami
(74) *Attorney, Agent, or Firm* — Stinson LLP

(57) ABSTRACT

Systems and methods of managing appliances distributed throughout a geographic area enable control of the appliances in response to regionally localized events. An asset management server determines the location of the appliances throughout the geographic area and issues commands to appliances in a specified region which cause the appliances to change local control parameters to address the event. An asset management server also receives operating data from the appliances and uses the operating data to determine when regional events are occurring based on localized anomalies in the operating data. Refrigeration appliances have GPS receivers so that the locations of the appliances in the geographic area can be verified. Further, refrigeration appliances have primary and secondary operating modes. Secondary operating modes may be address certain regional events that can occur from time to time.

19 Claims, 7 Drawing Sheets

(58) Field of Classification Search
CPC ....... H04L 67/125; H04L 67/52; H04L 67/01; G01S 19/01; G01S 19/14; H04W 4/021; H04W 4/029; F25C 1/12; F25D 29/00
See application file for complete search history.

(56) References Cited

U.S. PATENT DOCUMENTS

| | | | |
|---|---|---|---|
| 6,150,935 A | 11/2000 | Anderson |
| 6,370,890 B2 | 4/2002 | Roh et al. |
| 6,393,848 B2 | 5/2002 | Roh et al. |
| 6,442,952 B2 | 9/2002 | Roh et al. |
| 6,502,411 B2 | 1/2003 | Okamoto |
| 6,722,146 B2 | 4/2004 | Roh et al. |
| 6,842,721 B2 | 1/2005 | Kim et al. |
| 6,889,510 B2 | 5/2005 | Song et al. |
| 6,892,545 B2 | 5/2005 | Ishikawa et al. |
| 7,090,141 B2 | 8/2006 | Roh et al. |
| 7,110,832 B2 | 9/2006 | Ghent |
| 7,204,091 B2 | 4/2007 | Allison et al. |
| 7,296,459 B2 | 11/2007 | Son et al. |
| 7,490,477 B2 | 2/2009 | Singh et al. |
| 7,552,029 B2 | 6/2009 | Elwood et al. |
| 8,539,783 B1 | 9/2013 | Bunch |
| 8,653,949 B2 | 2/2014 | Lee et al. |
| 8,725,455 B2 | 5/2014 | Kriss |
| 9,024,716 B2 | 5/2015 | Yum et al. |
| 9,057,554 B2 | 6/2015 | Quinlan et al. |
| 9,091,475 B2 | 7/2015 | Kang et al. |
| 9,279,611 B2 | 3/2016 | Tan et al. |
| 9,441,991 B2 | 9/2016 | Haga et al. |
| 9,451,031 B2 | 9/2016 | Graziano et al. |
| 9,644,886 B2 | 5/2017 | Shim |
| 9,863,694 B2 | 1/2018 | Broadbent |
| 10,142,820 B2 | 11/2018 | Root |
| 10,153,915 B2 | 12/2018 | Doberstein et al. |
| 10,238,259 B2 | 3/2019 | Langhammer et al. |
| 10,256,982 B2 | 4/2019 | Rahman et al. |
| 10,321,182 B2 | 6/2019 | Herz |
| 10,341,133 B2 | 7/2019 | Wouhaybi et al. |
| 10,361,999 B2 | 7/2019 | Vazquez et al. |
| 10,380,863 B2 | 8/2019 | Wedig et al. |
| 10,420,151 B2 | 9/2019 | Zakaria |
| 10,444,868 B2 | 10/2019 | Lee |
| 10,465,960 B2 | 11/2019 | Prabhakaran et al. |
| 10,492,072 B1 | 11/2019 | Sokolov et al. |
| 10,506,019 B2 | 12/2019 | Brian |
| 10,510,110 B2 | 12/2019 | Takahashi et al. |
| 10,511,950 B2 | 12/2019 | Maier et al. |
| 10,531,247 B2 | 1/2020 | Kashef |
| 10,536,527 B2 | 1/2020 | Ocejo et al. |
| 10,540,871 B2 | 1/2020 | Wedig et al. |
| 10,547,498 B1 | 1/2020 | Garner et al. |
| 10,563,899 B2 | 2/2020 | Wilson |
| 10,567,567 B2 | 2/2020 | Seo et al. |
| 10,578,353 B2 | 3/2020 | Seidl et al. |
| 10,673,707 B2 | 6/2020 | Dhanabalan et al. |
| 10,722,096 B2 | 7/2020 | Gary, Jr. et al. |
| 10,764,374 B1 | 9/2020 | Marquardt et al. |
| 10,769,916 B2 | 9/2020 | Kim et al. |
| 10,769,929 B2 | 9/2020 | Qiu et al. |
| 2003/0000233 A1 | 1/2003 | Mazereeuw |
| 2003/0033165 A1 | 2/2003 | Inoue et al. |
| 2003/0074912 A1 | 4/2003 | Maeda et al. |
| 2004/0016242 A1 | 1/2004 | Song et al. |
| 2005/0008539 A1 | 1/2005 | Matsuura et al. |
| 2005/0120727 A1 | 6/2005 | Flinner et al. |
| 2005/0132725 A1 | 6/2005 | Menten et al. |
| 2006/0123806 A1 | 6/2006 | Vassilev et al. |
| 2006/0143520 A1 | 6/2006 | Matsushima et al. |
| 2006/0146773 A1 | 7/2006 | An et al. |
| 2006/0150662 A1 | 7/2006 | Lee et al. |
| 2006/0272341 A1 | 12/2006 | Shin et al. |
| 2008/0250324 A1 | 10/2008 | Ito |
| 2009/0024726 A1 | 1/2009 | Jeon et al. |
| 2009/0072962 A1 | 3/2009 | Hitchin |
| 2009/0273470 A1 | 11/2009 | Sinkevicius et al. |
| 2009/0277199 A1 | 11/2009 | Manas et al. |
| 2010/0152904 A1 | 6/2010 | Kawaguchi et al. |
| 2011/0132009 A1 | 6/2011 | Lee |
| 2012/0262294 A1 | 10/2012 | Nikolovski |
| 2014/0216071 A1 | 8/2014 | Broadbent |
| 2014/0244825 A1 | 9/2014 | Cao et al. |
| 2015/0096352 A1 | 4/2015 | Peterson et al. |
| 2015/0170503 A1 | 6/2015 | Wedig et al. |
| 2015/0192338 A1 | 7/2015 | Knatt |
| 2015/0285552 A1 | 10/2015 | Swaidan et al. |
| 2016/0018158 A1 | 1/2016 | Yokoo et al. |
| 2016/0134432 A1 | 5/2016 | Hund et al. |
| 2016/0139067 A1 | 5/2016 | Grace |
| 2016/0204953 A1 | 7/2016 | Kim et al. |
| 2017/0076584 A1 | 3/2017 | Eskildsen et al. |
| 2017/0152132 A1 | 6/2017 | Laible |
| 2017/0169189 A1 | 6/2017 | Belz et al. |
| 2017/0186079 A1 | 6/2017 | Kim et al. |
| 2017/0250834 A1 | 8/2017 | Hsiao |
| 2017/0292780 A1 | 10/2017 | Li |
| 2017/0310498 A1 | 10/2017 | Brandman et al. |
| 2018/0005307 A1 | 1/2018 | Abedin et al. |
| 2018/0102572 A1 | 4/2018 | Wedig et al. |
| 2018/0102918 A1 | 4/2018 | Amini et al. |
| 2018/0137457 A1 | 5/2018 | Sachs et al. |
| 2018/0176774 A1 | 6/2018 | Miller |
| 2018/0187969 A1 | 7/2018 | Kim et al. |
| 2018/0197175 A1 | 7/2018 | Groarke |
| 2018/0211208 A1 | 7/2018 | Winkle et al. |
| 2018/0306476 A1 | 10/2018 | Brady et al. |
| 2018/0313594 A1 | 11/2018 | Park |
| 2018/0315200 A1 | 11/2018 | Davydov et al. |
| 2018/0338280 A1 | 11/2018 | Zakaria et al. |
| 2019/0003757 A1 | 1/2019 | Miros et al. |
| 2019/0073800 A1 | 3/2019 | Lochny |
| 2019/0133165 A1 | 5/2019 | Schmitz |
| 2019/0174207 A1 | 6/2019 | Cella et al. |
| 2019/0182259 A1 | 6/2019 | Qian et al. |
| 2019/0182345 A1 | 6/2019 | Ji et al. |
| 2019/0191284 A1 | 6/2019 | Tran et al. |
| 2019/0245713 A1 | 8/2019 | Lo et al. |
| 2019/0264976 A1 | 8/2019 | Kim et al. |
| 2019/0323767 A1 | 10/2019 | Meyers |
| 2019/0333027 A1 | 10/2019 | Jones et al. |
| 2019/0368805 A1 | 12/2019 | Lim et al. |
| 2019/0390897 A1 | 12/2019 | Lee et al. |
| 2020/0076640 A1 | 3/2020 | Han et al. |
| 2020/0080769 A1 | 3/2020 | Han et al. |
| 2020/0090192 A1 | 3/2020 | Sim et al. |
| 2020/0096253 A1 | 3/2020 | Han et al. |
| 2020/0097776 A1 | 3/2020 | Kim et al. |
| 2020/0119946 A1 | 4/2020 | Ramirez et al. |
| 2020/0124329 A1 | 4/2020 | Han et al. |
| 2020/0132364 A1 | 4/2020 | Tran et al. |
| 2020/0143294 A1 | 5/2020 | Brady et al. |
| 2020/0219377 A1 | 7/2020 | Shoari et al. |
| 2020/0220932 A1 | 7/2020 | Gardner et al. |
| 2020/0225626 A1 | 7/2020 | Huo et al. |
| 2020/0248953 A1 | 8/2020 | Fujii |
| 2020/0252231 A1 | 8/2020 | Nakashima |
| 2020/0257321 A1 | 8/2020 | Ranjan et al. |
| 2020/0260653 A1 | 8/2020 | Douglas et al. |
| 2020/0278915 A1 | 9/2020 | Degaonkar et al. |
| 2020/0285258 A1 | 9/2020 | Kates |
| 2020/0295963 A2 | 9/2020 | Dulski et al. |
| 2020/0322177 A1 | 10/2020 | Kim et al. |

FOREIGN PATENT DOCUMENTS

| | | |
|---|---|---|
| KR | 1020200009742 A | 1/2020 |
| WO | 2002001920 A1 | 1/2002 |
| WO | 2005057093 A1 | 3/2006 |
| WO | 2010089193 A1 | 6/2010 |
| WO | 2011030288 A1 | 3/2011 |
| WO | 2012004747 A1 | 1/2012 |
| WO | 2013040854 A1 | 3/2013 |
| WO | 2013118142 A2 | 8/2013 |
| WO | 2013139189 A1 | 9/2013 |

(56) References Cited

FOREIGN PATENT DOCUMENTS

| | | |
|---|---|---|
| WO | 2014141538 A1 | 9/2014 |
| WO | 2016131609 A1 | 8/2016 |
| WO | 2017033240 A1 | 2/2017 |
| WO | 2017100897 A1 | 6/2017 |
| WO | 2017107398 A1 | 6/2017 |
| WO | 2017141265 A1 | 8/2017 |
| WO | 2017179188 A1 | 10/2017 |
| WO | 2017193234 A1 | 11/2017 |
| WO | 2017193235 A1 | 11/2017 |
| WO | 2017193236 A1 | 11/2017 |
| WO | 2017193237 A1 | 11/2017 |
| WO | 2017193238 A1 | 11/2017 |
| WO | 2018000986 A1 | 1/2018 |
| WO | 2018023434 A1 | 2/2018 |
| WO | 2018023435 A1 | 2/2018 |
| WO | 2018023436 A1 | 2/2018 |
| WO | 2018044091 A1 | 3/2018 |
| WO | 2018227714 A1 | 12/2018 |
| WO | 2019035109 A1 | 2/2019 |
| WO | 2019041962 A1 | 3/2019 |
| WO | 2019042408 A1 | 3/2019 |
| WO | 2019158754 A1 | 12/2019 |
| WO | 2020031433 A1 | 2/2020 |
| WO | 2020111961 A1 | 6/2020 |
| WO | 2020205820 A1 | 10/2020 |

OTHER PUBLICATIONS

Extended European Search Report from EP Application No. 22154817.5 dated Nov. 22, 2022, 15 pages.

SYSTEMS, METHODS, AND APPLIANCES THAT ENABLE REGIONAL CONTROL OF REFRIGERATION APPLIANCES

This application claims priority to U.S. Provisional Patent Application Ser. No. 63/144,665, filed Feb. 2, 2021, and entitled SYSTEMS, METHODS, AND APPLIANCES THAT ENABLE REGIONAL CONTROL OF REFRIGERATION APPLIANCES, which is hereby incorporated by reference in its entirety for all purposes

FIELD

The present disclosure generally pertains to systems and methods for managing appliances distributed throughout a geographic area.

BACKGROUND

Appliances, including refrigeration appliances such as commercial and residential refrigerators, freezers, and ice makers are in wide use. Many modern appliances are able to connect to the internet. While network-connected appliances are known, the industry has not recognized all of the possibilities that network connection affords.

SUMMARY

In one aspect, a method of managing a plurality of refrigeration appliances distributed throughout a geographic area comprises establishing a connection between each refrigeration appliance and a remote asset management server on a client-server network. The asset management server identifies that an event has occurred in a specified region of the geographic area. The asset management server determines a subset of the plurality of refrigeration appliances located within the specified region of the geographic area. The asset management server sends a change control parameter command to each of the subset of refrigeration appliances over the client-server network. The change control parameter command is configured to cause a local controller of each of the subset of refrigeration appliances to change a control parameter for the respective refrigeration appliance.

In another aspect, a method of managing a plurality of refrigeration appliances distributed throughout a geographic area comprises establishing a connection between each refrigeration appliance and a remote asset management server on a client-server network. In a memory associated with the asset management server, a location of each of the refrigeration appliances in the geographic area is stored. At the asset management server, operating data from the plurality of refrigeration appliances is received. The operating data from each of the plurality of refrigeration appliances within the geographic area is evaluated to determine whether a localized event has occurred in a region of the geographic area.

In another aspect, a refrigeration appliance configured to connect to a remote asset management server which interacts with a plurality of refrigeration appliances in a geographic area comprises a local controller configured for selectively controlling the refrigeration appliance. A GPS receiver is connected to the local controller for providing a GPS location signal to the local controller from which a geographic location of the refrigeration appliance can be determined. A network interface is configured to provide communication between the local controller and the remote asset management server. The local controller is configured to send information about the GPS location signal to the remote asset management server via the network interface. The local controller is configured receive, from the remote asset management server, via the network interface, a change control parameter command, based on said information about the GPS location signal, sent to refrigeration appliances in a specified region of the geographic area. In response to receiving the change control parameter command, the local controller is configured to change a control parameter by which the local controller controls the refrigeration appliance.

In another aspect, an ice maker comprises a freeze plate. A refrigeration system is configured to cool the freeze plate. A sump is configured to hold water. A water system is configured to impart water into the sump, purge water from the sump, and distribute water from the sump onto the freeze plate such that ice forms on the freeze plate and unfrozen water flows off of the freeze plate back into the sump. A controller is configured to control the water system for conducting consecutive ice batch production cycles for making consecutive batches of ice. The controller is configured to selectively operate the ice maker in a normal operating mode and a secondary operating mode. The secondary operating mode is selected from the group of secondary operating modes consisting of: a safe operating mode in which the controller directs the water system to purge more water from the sump than in the normal mode; and a high efficiency operating mode in which the controller is configured to at least one of (i) operate a compressor of the refrigeration system at a lower speed than in the normal operating mode, (ii) operate a fan of the refrigeration system at a lower speed than in the normal operating mode, (iii) operate a pump motor of the water system at a lower speed than in the normal operating mode, or (iv) purge less water from the sump than in the normal operating mode.

In another aspect, an asset management server for managing a plurality of refrigeration appliances distributed throughout a geographic area comprises a processor. A memory stores processor-executable instructions. The processor being configured to execute the processor-executable instructions to establish a connection to each refrigeration appliance on a client-server network, identify that an event has occurred in a specified region of the geographic area, determine a subset of the plurality of refrigeration appliances located within the specified region of the geographic area, and send a change control parameter command to each of the subset of refrigeration appliances over the client-server network. The change control parameter command is configured to cause a local controller of each of the subset of refrigeration appliances to change a control parameter for the respective refrigeration appliance.

In another aspect, an asset management server for managing a plurality of refrigeration appliances distributed throughout a geographic area comprises a processor. A memory stores processor-executable instructions. The processor is configured to execute the processor-executable instructions to establish a connection between each refrigeration appliance and a remote asset management server on a client-server network, store in the memory a location of each of the refrigeration appliances in the geographic area, receive at the asset management server operating data from the plurality of refrigeration appliances, and evaluate the operating data from each of the plurality of refrigeration appliances within the geographic area to determine whether a localized event has occurred in a region of the geographic area.

Other aspects will be in part apparent and in part pointed out hereinafter.

BRIEF DESCRIPTION OF THE DRAWINGS

Corresponding reference characters indicate corresponding parts throughout the drawings.

DETAILED DESCRIPTION

The present inventors have recognized that external events can have localized effects on appliances such as refrigeration appliances, cooking appliances, cleaning appliances, and water-using appliances in different geographical locations. So for example, a localized weather event such a drought or flood can affect the hardness of a local water supply, which in turn affects how a water-using appliance such as an ice maker, dish washer, washing machine, water heater, water purifier, water softener, or the like functions. Similarly, a heatwave or a cold spell can affect ambient operating temperatures and available electrical energy from the grid. This can have an impact on the operation of all types of electrical appliances such as commercial and residential refrigerators, freezers, and ice makers, cooking appliances, cleaning appliances, etc. Other events such as forest fires, volcanos, dust storms, or the like can affect air quality in a particular geographical location. Under certain circumstances, it may be desirable to change how an appliance operates to account for a change in air quality. The inventors have recognized that the modern transition to network-connected refrigeration appliances has created an opportunity to implement regional control of refrigeration appliances to account for the effect of these regionally localized external events. Furthermore, the inventors have recognized that the transition to network-connected appliances, and the expanding Internet-of-Things network, has yielded an opportunity to identify changes in the performance of appliances by geographic region, and based on these trends, to implement regional controls that address what is observed in the data.

Figure 1:
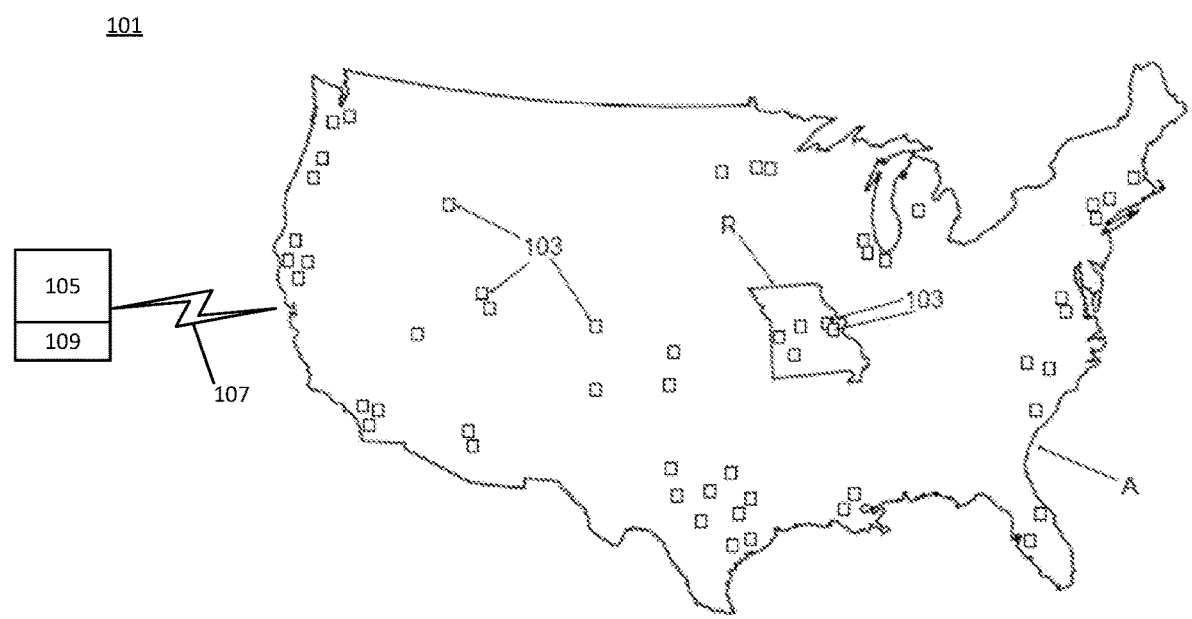
FIG. 1 is a schematic block diagram of an asset management system for managing a plurality of appliances distributed throughout a geographic area.

Referring to FIG. 1, an exemplary system for managing refrigeration appliances (broadly, a system for managing appliances) is generally indicated at reference number 101. The system broadly includes a plurality of refrigeration appliances 103 (each, broadly, an appliance) distributed throughout a geographic area A. In the illustrated embodiment, the geographic area A is shown to be the United States of America. However, the system can be used for appliances distributed over other geographic areas (including a worldwide geographic area) without departing from the scope of the disclosure.

A client-server network 107 (e.g., the internet) connects each of the refrigeration appliances 103 to an asset management server 105. The asset management server 105 is configured to determine the location of each of the refrigeration appliances 103 within the area A. For example, the asset management server 105 can determine the geographic location based on (i) a registered location that is stored in a memory 109 accessible to the asset management server, (ii) a network-derived location estimation, or (iii) GPS data sent by the refrigeration appliance 103 to the asset management server over the client-server network. The illustrated asset management server 105 is configured to selectively send commands to all of the refrigeration appliances 103 connected to the server by the network 107, any subset of a plurality of the refrigerated appliances connected to the server by the network, and/or to any single appliance addressed in a command. As explained more fully below, certain commands are configured to change local control parameters on the appliances 103 and thereby adjust the way the appliances operate. In addition, the refrigeration appliances 103 are configured to send operating data to the asset management server 105, which the asset management server stores in memory 109. Thus, it can be seen that the network 107 facilitates interaction between the asset management server 105 and the appliances 103. As will be explained more fully below, when a localized event occurs that affects a specified region R of the geographic area, the asset management server 105 can determine which of the appliances 103 are located within the perimeter of the specified region and issue a command to the determined subset of the appliances to change a control parameter in response to the event. Additionally, the illustrated asset management server 105 is configured to evaluate the operating data from each of the appliances 103 within the geographic area A to determine whether a localized event has occurred in a region of the geographic area.

It will be understood that the "asset management server" could be a dedicated server system at a single location or distributed computing resources (e.g., a cloud-based system) capable of running the asset management application (e.g., an SAAS application) and communicating with the refrigeration appliances 103 over the client-server network 107. In certain embodiments, the refrigeration appliances 103 are registered to the asset management server 105 to gain membership in the network-connected asset management system 101. Through the registration process or any other suitable way, the asset management server 105 can store in memory 109 address information for each of the appliances 103 by which the asset management server 105 can address commands to particular appliances and determine which of the appliances is the source of operating data as it is received. In some cases, when an appliance 103 is registered to the asset management server 105, the operator of the appliance provides the server an indication of the location at which the appliance 103 is being deployed and the server stores an indication of the location in the memory 109. For example, registering an appliance to the asset management system could require entry of an address where the appliance resides or standard cartographic coordinates for the location of the appliance. When no source of real-time or self-verifying location data (discussed below) is available, the asset management server can use this registered location as the assumed location of the appliance for purposes of geographic-based control and localized event determination.

In an exemplary embodiment, each of the refrigeration appliances 103 is a commercial ice maker, which is particularly susceptible to regionally localized events such as sudden changes in water quality. An exemplary embodiment of a commercial ice maker as shown herein is described more fully in U.S. patent application Ser. No. 17/147,965, filed Jan. 13, 2021, and entitled ICE MAKER, which is hereby incorporated by reference in its entirety. It will be understood that the system 101 can include other types of refrigeration appliances, such as commercial refrigerators, commercial freezers, and residential refrigeration appliances. (See discussion of regional control of refrigerators and freezers infra). In general, "refrigeration appliances" in the scope of this disclosure comprise a refrigeration system (e.g., a vapor-compression system, thermoelectric system, and/or other suitable refrigeration system) that is configured to cool a particular area associated with the appliance. In the case of the ice makers 103, each refrigeration system is configured to cool an ice formation device where water collects and is chilled to freeze into collectable ice. In the case of many other types of refrigeration appliances, the refrigeration system will cool a defined storage area, such as the space inside a reach-in cabinet, display cabinet, drawer, walk-in compartment, etc. Refrigeration appliances in the scope of this disclosure also include local controllers for operating the refrigeration appliance and/or receiving operating data from various components of the appliance.

Although this disclosure specifically details use of the asset management system 101 with refrigeration appliances, the principles of using the asset management system for regional control of appliances may be applied to other types of appliances (e.g., kitchen appliances, cooking appliances, cleaning appliances (e.g., sterilization appliances), water-using appliances, and medical appliances or devices) without departing from the scope of the disclosure. Other appliances in the scope of this disclosure will typically comprise an electronic local control system that includes one or more electronically controllable parts which carry out one or more appliance functions, one or more components that output a signal representing a real-time indication of how one or more aspects of the appliance is operating or performing, and a local controller for operating the controllable parts and/or receiving operating data from the signal outputting components of the appliance. Furthermore, appliances in the scope of this disclosure will typically comprises a network interface or port (e.g., a cellular data antenna or Wi-Fi antenna) that enables the appliances to connect to the asset management system network and communicate with the remote asset management system server.

In many cases, local control systems of appliances (e.g., refrigeration appliances) in the scope of this disclosure will be configured to selectively operate the appliance in at least first and second operating modes. For example, local controllers can selectively operate the appliance in normal operating mode (e.g., a full capacity mode or primary operating mode) or a high efficiency operating mode (e.g., high energy efficiency mode or low resource usage mode such as low water usage mode). Certain local controllers can selectively operate appliances in each of a normal operating mode and a safe mode in which operation of the refrigeration appliance is adapted to some condition that has the potential to be harmful to either the health of the appliance or its users. Each of the high efficiency operating mode and the safe operating mode may broadly be considered a secondary operating mode of the appliance. Other selectable operating modes (e.g., other secondary operating modes) are also contemplated within the scope of the disclosure. Various ways of implementing the switchover between primary and secondary operating modes fall within the scope of this disclosure. For instance, in one or more embodiments, the local controller can access control parameters from a local memory which includes registers that define the operating mode. As a further example, the memory may have binary registers for each of the primary and secondary operating modes of the appliance. In exemplary embodiments, the asset management server can issue "change control parameter commands" to the appliance that write new values into these registers and/or other registers for control parameters of the appliance. In an exemplary embodiment, the ice maker 103 has numbered registers, which may be split up into groups, for transmission over the network. In an exemplary embodiment, ice maker includes a modem such as a Sercomm Socket Modem to send data maintained in the numbered registered. "RAW_DATA." As will be seen in Tables 2 and 3, each register number corresponds to a different parameter of the ice maker. In an acceptable embodiment, the groups of register values are read from the ice maker 103 and sent to the server 105 in JavaScript Object Notation (JSON) format:
{"data":{message":"RAW_DATA","msgSeq":"1"},"class": "IceMachine","object":"Modem","RSRP":number, "RSRQ":number,"TAC":"string","CellID":"number", "RSSI":int,"MCC":int,"MNC":int}. The data is sent using Modbus protocol in ASCII mode. In ASCII mode, messages start with a colon ":" character (ASCII 3A hex), and it ends with a carriage return-line feed "CLRF" pair (ASCII oD and oA hex). To void a possible JSON format error, oxoD and oxoA hex data are not used in a payload's message.

Figure 2:
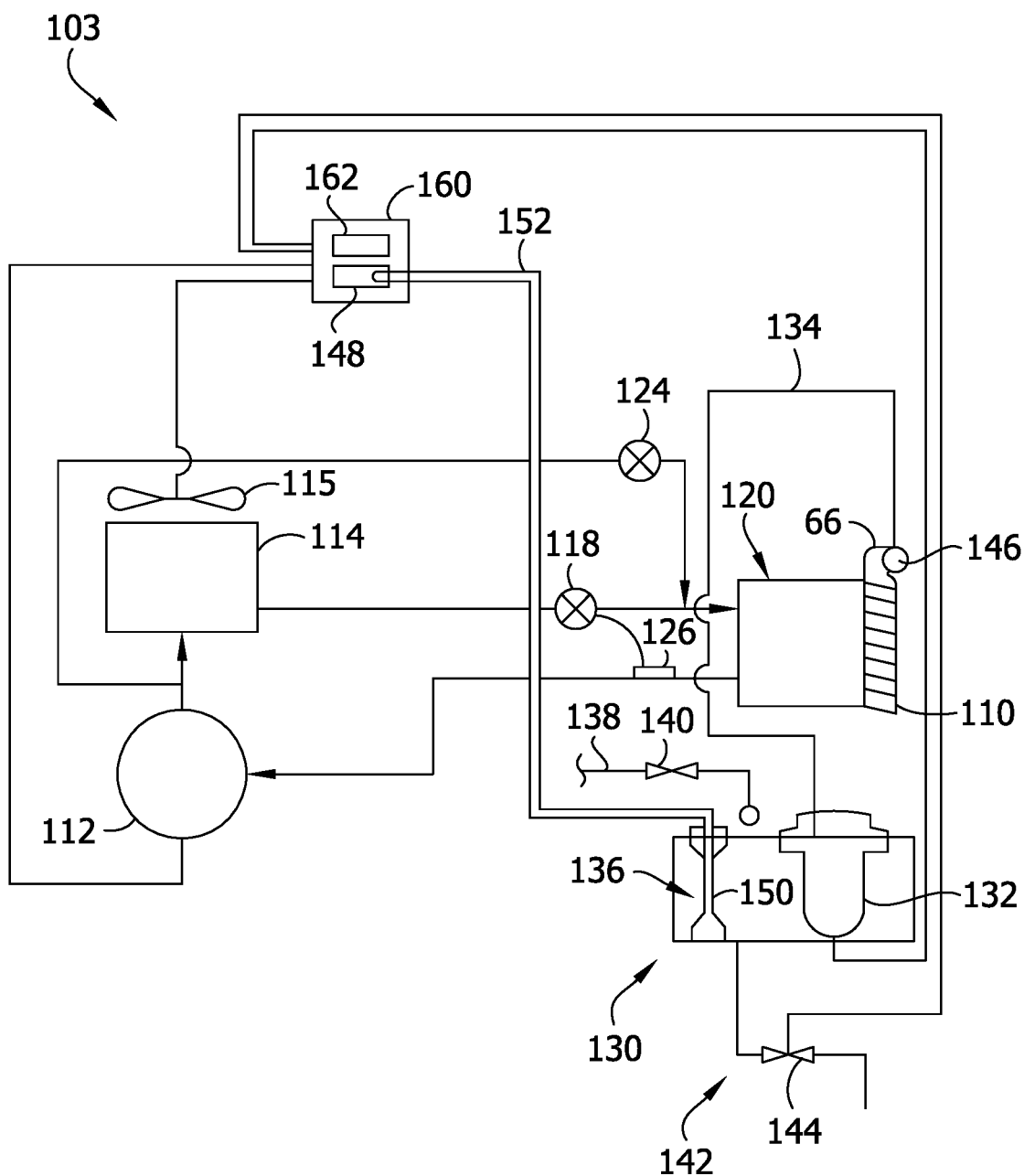
FIG. 2 is a schematic illustration of an ice maker that can be used with the asset management system of FIG. 1.

Referring to FIG. 2, an exemplary embodiment of an ice maker 103 that may be used in the asset management system 101 will now be briefly described. Ice makers in the scope of this disclosure may broadly comprise an ice formation device on which water can form into pieces of ice, a water system for directing water onto the ice formation device, and a refrigeration system configured to cool the ice formation device to a temperature at which at least some of the liquid water present on the ice formation device will freeze into ice. In the illustrated embodiment, the ice maker is a batch ice maker of the type which has a generally vertically oriented freeze plate 110 that constitutes the ice formation device. Other types of ice makers such as nugget ice makers and vertical spray ice makers are also contemplated to be in the scope of this disclosure. In a nugget ice maker, the ice formation device is typically a chilled cylinder disposed inside an auger; and in a vertical spray ice maker, the ice formation device is typically a horizontally oriented freeze plate in which ice piece molds open downward.

The refrigeration system of the ice maker 103 includes a compressor 112, a heat rejecting heat exchanger 114, a refrigerant expansion device 118 for lowering the temperature and pressure of the refrigerant, an evaporator 120 along the back side of the freeze plate 110, and a hot gas valve 124. The compressor 112 can be a fixed speed compressor or a variable speed compressor to provide a broader range of operational control possibilities. As shown, the heat rejecting heat exchanger 114 may comprise a condenser for condensing compressed refrigerant vapor discharged from the compressor 112. In other embodiments, e.g., in refrigeration systems that utilize carbon dioxide refrigerants where the heat of rejection is trans-critical, the heat rejecting heat exchanger is able to reject heat from the refrigerant without condensing the refrigerant. Hot gas valve 124 is selectively opened to direct warm refrigerant from the compressor 114 directly to the evaporator 120 to remove or harvest ice cubes from the freeze plate 110 when the ice has reached the desired thickness.

The refrigerant expansion device 118 can be of any suitable type, including a capillary tube, a thermostatic expansion valve, or an electronic expansion valve. In certain embodiments, where the refrigerant expansion device 118 is a thermostatic expansion valve or an electronic expansion valve, the ice maker 110 may also include a temperature sensor 126 placed at the outlet of the evaporator 120 to control the refrigerant expansion device 118. In other embodiments, where the refrigerant expansion device 118 is an electronic expansion valve, the ice maker 110 may also include a pressure sensor (not shown) placed at the outlet of the evaporator 120 to control the refrigerant expansion device 118 as is known in the art. In certain embodiments that utilize a gaseous cooling medium (e.g., air) to provide condenser cooling, a condenser fan 115 may be positioned to blow the gaseous cooling medium across the condenser 114. The condenser fan 115 can be a fixed speed fan or a variable speed fan to provide a broader range of control possibilities. The compressor 112 cycles a form of refrigerant through the condenser 114, expansion device 118, evaporator 120, and the hot gas valve 124, via refrigerant lines.

Referring still to FIG. 2, a water system of the illustrated ice maker 10 includes a sump 130, a water pump 132, a water line 134 (broadly, passaging), and a water level sensor 136. The water pump 132 could be a fixed speed pump or a variable speed pump to provide a broader range of control possibilities. The water system of the ice maker 103 further includes a water supply line 138 and a water inlet valve 140 for filling the sump 130 with water from a water source (e.g., a municipal water utility). The illustrated water system further includes a drain line 142 (also called, drain passaging or a discharge line) and a drain valve 144 (e.g., purge valve, drain valve; broadly, a purge device) disposed thereon for draining water from the sump 130. The sump 130 may be positioned below the freeze plate 110 to catch water coming off of the freeze plate such that the relatively cool water falling from the freeze plate may be recirculated by the water pump 132. The water line 134 fluidly connects the water pump 132 to a water distributor 146 above the freeze plate. During an ice batch production cycle, the pump 132 is configured to pump water through the water line 134 and through the distributor 146. The distributor is configured to distribute the water imparted through the distributor 146 evenly across the front of the freeze plate 110 so that the water flows downward along the freeze plate and any unfrozen water falls off of the bottom of the freeze plate into the sump 130.

In an exemplary embodiment, the water level sensor 136 comprises a remote air pressure sensor 148. It will be understood, however, that any type of water level sensor may be used in the ice maker 103 including, but not limited to, a float sensor, an acoustic sensor, or an electrical continuity sensor. The illustrated water level sensor 136 includes a fitting 150 that is configured to couple the sensor to the sump 130. The fitting 150 is fluidly connected to a pneumatic tube 152. The pneumatic tube 152 provides fluid communication between the fitting 150 and the air pressure sensor 148. Water in the sump 130 traps air in the fitting 150 and compresses the air by an amount that varies with the level of the water in the sump. Thus, the water level in the sump 130 can be determined using the pressure detected by the air pressure sensor 148. Additional details of exemplary embodiments of a water level sensor comprising a remote air pressure sensor are described in U.S. Patent Application Publication No. 2016/0054043, which is hereby incorporated by reference in its entirety.

Figure 3:
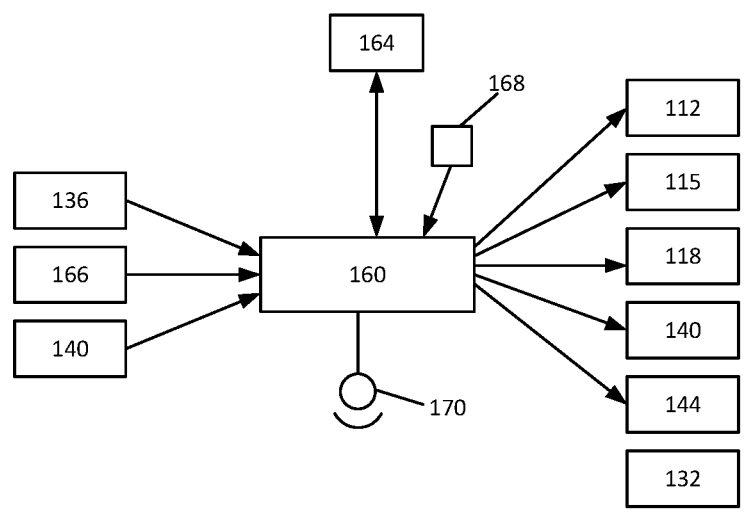
FIG. 3 is a schematic block diagram of a control system of the ice maker of FIG. 2.

Referring to FIGS. 2 and 3, the ice maker 103 includes a controller 160 (e.g., a "local controller" or an "appliance controller"). The controller 160 includes at least one processor 162 for controlling the operation of the ice maker 103, e.g., for controlling at least one of the refrigeration system and the water system. The processor 162 of the controller 160 may include a non-transitory processor-readable medium storing code representing instructions to cause the processor to perform a process. The processor 162 may be, for example, a commercially available microprocessor, an application-specific integrated circuit (ASIC) or a combination of ASICs, which are designed to achieve one or more specific functions, or enable one or more specific devices or applications. In certain embodiments, the controller 160 may be an analog or digital circuit, or a combination of multiple circuits. The controller 160 may also include one or more memory components 164 (FIG. 3) for storing data in a form retrievable by the controller. The controller 160 can store data in or retrieve data from the one or more memory components.

Referring to FIG. 3, in various embodiments, the controller 160 may also comprise input/output (I/O) components to communicate with and/or control the various components of ice maker 103. In certain embodiments, for example, the controller 160 may receive inputs such as, for example, one or more indications, signals, messages, commands, data, and/or any other information, from the water level sensor 136, a harvest sensor 166 for determining when ice has been harvested, an electrical power source (not shown), an ice level sensor 140 for detecting the level of ice in a bin (not shown) below the ice maker 103, and/or a variety of sensors and/or switches including, but not limited to, pressure transducers, temperature sensors, acoustic sensors, etc. In various embodiments, based on those inputs and predefined control instructions stored in the memory components 164, the controller 160 controls the ice maker 103 by outputting control signals to controllable output components such as the compressor 112, the condenser fan 115, the refrigerant expansion device 118, the hot gas valve 124, the water inlet valve 140, the drain valve 144, and/or the water pump 132. Such control signals may include one or more indications, signals, messages, commands, data, and/or any other information to such components. In the illustrated embodiment, the ice maker 103 (broadly, the refrigeration appliance; or more broadly still, the appliance) comprises a GPS receiver 168 connected to the local controller 160 for providing a GPS location signal to the controller from which a geographic location of the appliance can be determined.

The illustrated controller 160 is configured to selectively control the ice maker 103 in a plurality of different operating modes, including a normal operating mode, a safe operating mode, a high efficiency operating mode, and a locked mode. The terms "safe mode" and "safe operating mode" are used in this disclosure to describe modes of operation that, as compared with the normal operating mode, are believed to be less likely to result in harm to the refrigeration appliance, its users, or the general public. The terms "high efficiency mode" and "high efficiency operating mode" are used in this disclosure to describe modes of operation that, as compared with the normal operating mode, cause the appliance to utilize less energy or less of another resource (e.g., water, fuel, etc.). As explained below, in the "locked mode" use of one or more aspects of the appliance (e.g., a primary aspect, like making ice in the case of the ice maker 103) is altogether prevented. An exemplary embodiment of an ice maker and asset management system implement selective locked mode operation of ice makers on the network is described in U.S. Patent Application No. 63/144,781, filed Feb. 2, 2021, and entitled SYSTEMS AND METHODS FOR MANAGING LEASED APPLIANCES, which is hereby incorporated by reference in its entirety.

In the illustrated embodiment, the controller 160 has predefined software or circuitry for locally controlling the ice maker in a selected one of the normal operating mode, safe operating mode, high efficiency operating mode, locked mode, and off/standby mode. For example, the memory 164 includes registers for each of the operating modes and the controller 160 controls the ice maker 103 in accordance with pre-programmed instructions for the operating mode of the currently active register. Alternatively, the asset management server 105 can remotely define and implement secondary operating modes by issuing change control parameter commands to the ice maker 103 that alter particular control parameters and thereby effectively change the operating mode of the appliance. In other words, the asset management system 101 enables switching operating modes even when the ice maker 103 lacks local predefined operating modes configured into the local control system.

Referring again to FIG. 2, during the normal operating mode, the safe operating mode, and the high efficiency operating mode, the controller 160 is generally configured to conduct consecutive ice batch production cycles. Each ice batch production cycle comprises steps of freezing the ice (a freeze step), harvesting the ice (a harvest step), and filling the sump 130 (a fill step). At least some of the ice batch production cycles comprise steps of purging hard water from the sump 130 after a batch of ice is formed and before the sump is refilled (a purge step).

An exemplary embodiment of a normal operating mode will be briefly described before identifying the ways in which exemplary embodiments of a safe operating mode, a high efficiency operating mode, and a locked mode differ from the normal operating mode. During the freeze step, the refrigeration system is operated to cool the freeze plate 110. At the same time, the pump 132 circulates water from the sump 130 through the water line 134 and further through the distributor 146. The distributor 146 distributes water along the top portion of the freeze plate 110. As the water flows down the front of the freeze plate 110, some of the water freezes into ice, forming ice pieces on the freeze plate of gradually increasing thickness. The unfrozen water falls off of the freeze plate 110 back into the sump 130.

When the ice reaches a thickness that is suitable for harvesting, the controller 160 switches from the freeze step to the ice harvest step. The pump 132 is turned off and the hot gas valve 124 is opened to redirect hot refrigerant gas to the evaporator 120. The hot gas warms the freeze plate 110, causing the ice to melt. The melting ice falls from the freeze plate into an ice bin (not shown) below. The hot gas valve 124 is closed after the ice has fallen from the freeze plate, as indicated by the harvest sensor 166.

Figure 4:
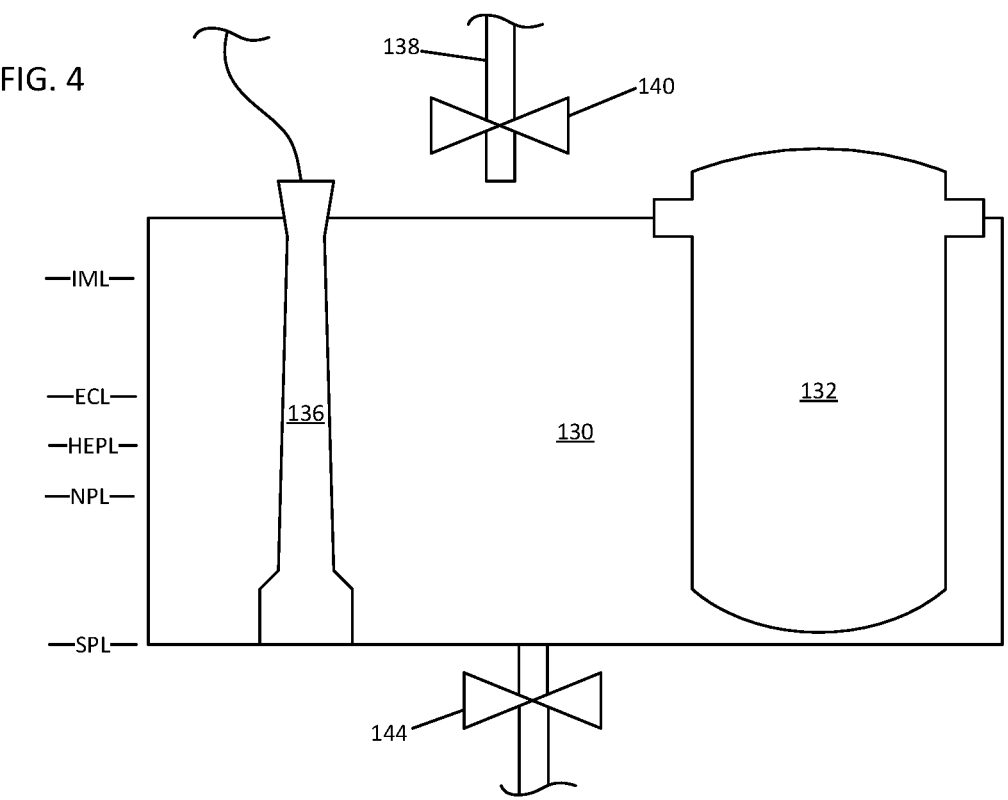
FIG. 4 is a schematic illustration of a sump of the ice maker of FIG. 2, showing certain water levels associated with a various operating modes of the ice maker.

Before beginning another ice batch production cycle, the sump 130 must be refilled. Referring to FIG. 4, at the end of the freeze step, the sump has an end-of-circulation water level ECL that is less than an ice making water level IML at which the ice maker beings each ice batch production cycle. Thus, before beginning a subsequent freeze step, the controller 160 opens the water inlet valve 140 to let new supply water into the sump 130. The controller 160 closes the water inlet valve 140 when the water level sensor 136 provides an indication to the controller that the water level in the sump 130 reaches the ice making water level IML.

As can be seen from above, after each freeze step is complete cold water in the sump has drawn down from the ice making water level IML to the end-of-circulation water level ECL. For energy efficiency purposes, it is desirable to maintain a relatively large volume of cold water in the sump 130 at the end-of-circulation level ECL. That way, the sump water functions as a cold reservoir and chills the new supply water that fills the sump from the end-of-circulation water level ECL to the ice making water level IML. It can be seen that, at the beginning of each ice batch production cycle, a greater proportion of new supply water in the sump 130 will result in higher temperature water in the sump, requiring more cooling energy to form into pieces of ice during the freeze step. However, at least periodically, e.g., once every n cycles or once every x minutes, it is beneficial to purge a portion of the water from the sump 130 before beginning a new ice production cycle. This is advantageous because, during the freeze step, as the water flows down the front of the freeze plate 110, impurities in the water such as calcium and other minerals in solution will remain in solution with the liquid water as purer water freezes. Thus, during each freeze step, the concentration of impurities in the water will increase. Excessive concentrations of impurities can quickly degrade the performance of the ice maker and even render it inoperable. Thus, in the normal operating mode of the illustrated ice maker 103, every $n_{normal}$ ice batch production cycles or every $x_{normal}$ minutes, the controller 160 will conduct a purge step before the fill step by opening the drain valve 144 to purge a portion of the residual water from the sump 130 from the end-of-circulation water level ECL to a normal mode purge threshold water level NPL. The value of $n_{normal}$ can be 1 or greater. The controller 160 directs the drain valve 144 to close when the water level sensor 136 provides an indication to the controller that the water level in the sump 130 reaches the normal mode purge threshold NPL water level. The drain valve 144 is one suitable type of purge mechanism but other types of purge mechanisms (e.g., active drain pumps) can also be used to execute the above-described purge step without departing from the scope of the disclosure.

In one or more embodiments, the controller 160 conducts consecutive ice batch production cycles during the safe operating mode in substantially similar manner to the normal operating mode described above, except that the controller causes a greater amount of water to be purged from the sump 130 during the safe operating mode than during the normal operating mode. In certain embodiments, the controller 160 can be configured to conduct the purge step more frequently during the safe mode than the normal mode. So for example, in one or more embodiments, during the safe mode of operation, the controller 160 is configured to conduct the purge step every $n_{safe}$ ice batch production cycles or every $x_{safe}$ minutes, where $n_{safe}$ is less than $n_{normal}$ and $x_{safe}$ is less than $x_{normal}$. In certain embodiments, as compared with purge steps conducted during the normal operating modes, the controller 160 can be configured to purge more water from the sump 130 during each purge step conducted during the safe operating mode. For example, in the safe mode of operation, during each purge step, the controller 160 is configured to open the drain valve 144 to purge water from the sump 130 until the water level sensor 135 provides an indication to the controller that the water level in the sump 130 reaches a safe mode purge threshold SPL that is less than the normal mode purge threshold NPL. In an exemplary embodiment, the safe mode purge threshold SPL corresponds to a condition in which substantially all of the water from the sump 130 has been purged or drained out of the sump so that the sump is substantially empty. In an exemplary embodiment, during the safe mode of operation the controller 160 purges the water to the safe mode purge threshold SPL during every ice batch production cycle. Purging substantially all of the water from the sump 130 during every ice batch production cycle can greatly improve the performance of the ice maker when the supply water contains a very high concentration of hard calcium or other minerals in solution.

It is contemplated that the controller 160 can differentiate between the normal and safe modes of operation in other ways in one or more embodiments. For example, it is known to control an ice maker to periodically conduct a condenser cleaning operation. In one embodiment, as described in U.S. Patent Application Publication No. 2016/0327352, which is hereby incorporated by reference in its entirety, the condenser cleaning operation comprises stopping the compressor and running the condenser fan in the reverse direction to remove dust and other particulate from the condenser. It is contemplated that the controller 160 can conduct a condenser cleaning operation more frequently during a safe mode of operation than during a normal mode of operation. For example, the controller can conduct a condenser cleaning operation every $m_{normal}$ ice batch production cycles or every $y_{normal}$ minutes during the normal mode of operation and every $m_{safe}$ ice batch production cycles or every $y_{safe}$ minutes during the safe mode of operation, where $m_{safe}$ is less than $m_{normal}$ and $y_{safe}$ is less than $y_{normal}$. In this context, instead of the safe operating mode addressing hard water conditions, the safe operating mode may address poor air quality conditions. In a similar vein, it is known to use automated sanitizers such as ozone sanitizers to sanitize the interior of an ice maker. In another embodiment, the controller 160 can conduct an automated sanitizing operation more frequently and/or with greater intensity during a safe mode of operation than during a normal mode of operation. Still other ways of operating an ice maker in a safe mode of operation are possible without departing from the scope of the disclosure. Further, the controller 160 can be configured to selectively operate the ice maker 103 in a plurality of different safe modes. For instance, the controller can selectively operate the ice maker 103 in a first safe mode in which more water is purged from the sump than the normal mode, a second safe mode in which more water is purged from the sump than the first safe mode, etc.

In one or more embodiments, the controller 160 conducts consecutive ice batch production cycles during the high efficiency operating mode in substantially similar manner to the normal operating mode described above, except that the controller causes less water to be purged from the sump 130 during the safe operating mode than during the normal operating mode. In certain embodiments, the controller 160 can be configured to conduct the purge step less frequently during the high efficiency operating mode than during the normal operating mode. So for example, in one or more embodiments, during the high efficiency operating mode, the controller 160 is configured to conduct the purge step every $n_{eff}$ ice batch production cycles or every $x_{eff}$ minutes, where $n_{eff}$ is greater than $n_{normal}$ and $x_{eff}$ is greater than $x_{normal}$. In certain embodiments, as compared with purge steps conducted during the normal operating mode, the controller 160 can be configured to purge less water from the sump 130 during each purge step conducted during the high efficiency operating mode. For example, in the high efficiency mode of operation, during each purge step, the controller 160 is configured to open the drain valve 144 to purge water from the sump 130 until the water level sensor 136 provides an indication to the controller that the water level in the sump 130 reaches a high efficiency mode purge threshold HEPL that is greater than the normal mode purge threshold NPL. As described above, purging less water from the ice maker can help the ice maker use less electrical energy by supplying cooler water to the freeze plate 110 from the beginning of the subsequent freeze step. Further, by purging less water, the ice maker consumes less water to make the same amount of ice.

It is contemplated that the controller 160 can differentiate between the normal and high efficiency modes of operation in other ways in one or more embodiments. For example, when a variable speed compressor 112, condenser fan 115, and/or pump 132 is used, the controller 160 can operate one or more of the variable speed compressor, the variable speed condenser fan, or the variable speed water pump 132 at a lower speed in the high efficiency mode than in the normal operating mode, thus conserving electrical energy. Further, the controller 160 can be configured to selectively operate the ice maker 103 in a plurality of different high efficiency modes, e.g., a set of high efficiency modes that differ from the normal operating mode in energy or other resource consumption by gradually increasing amounts.

In contrast to the safe mode and the high efficiency mode, in the locked mode, the controller 160 is configured to altogether prevent the ice maker 103 from making ice. For example, the controller 160 may maintain the water inlet valve 140 in the closed position and/or prevent the compressor 112 from operating.

Referring to FIG. 3, the appliance control system further comprises a network interface 170 configured to connect the appliance 103 to the client-server network 107 for communication with the remote asset management server 105. In other words, the network interface 170 is configured to provide communication between the local controller 160 of the appliance 103 and the remote asset management server 105. An exemplary embodiment of communications architecture for use in an asset management system for appliances is described in greater detail in U.S. Pat. No. 9,863,694, which is hereby incorporated by reference in its entirety. The illustrated network interface 170 comprises a wireless transceiver such as a cellular data transceiver or a Wi-Fi transceiver. Other types of network interfaces (e.g., hardwired internet ports, etc.) can also be used without departing from the scope of the disclosure. The network interface 170 is broadly configured to pass operating data from the appliance 103 to the asset management server 105 and pass commands from the asset management server to the appliance. In the illustrated embodiment, the network interface 170 is further configured to provide the remote asset management server with information from the GPS receiver 168 about the geographic location of the ice maker within a geographic area A.

Various types of operating data and commands can be passed between the appliances 103 and the server 105 within the scope of disclosure, and it will be understood that the specific operating data and commands in any given asset management server 101 will depend on factors such as the types of appliances on the network, the particular control schemes used for controlling the appliances, the operating characteristics of interest to the network, and as will be understood in view of the further discussion of regional control below, the types of localized events that are monitored and/or addressed by the asset management system.

"Operating parameters" may include, among other things, measured or sensed values indicating one or more aspects of the performance of the appliance 103, as well as values for control settings such as set point values, limit values, etc. An exemplary embodiment of operating parameters that may be sent from an ice maker 103 to the asset management system is described in Table I below. Table II only contains a small sampling of potential operating parameters.

TABLE I

| REGISTER NO. | DEFINITION | DIMENSION | Read/Write |
|---|---|---|---|
| 1 | Temperature of the air | ° C. | R |
| 2 | Temperature at the evaporator | ° C. | R |
| 3 | Temperature of water | ° C. | R |
| 4 | Temperature of water supply | ° C. | R |
| 5 | Water level | mm | R |
| 6 | Percentage of the ice bin that is full (broadly, ice level) | % | R |
| 7 | Maximum pressure during last freeze cycle on high pressure side of compressor | psi | R |
| 8 | Alarm to indicate fault at outlet of evaporator | binary | R |
| 9 | Ice production cycle time | minutes | R |
| 10 | Freeze step time | minutes | R |
| 11 | Harvest step time | minutes | R |
| 12 | Energy consumption | kWh | R |
| 13 | Location | GPS coordinates | R |

In the above Table, the Register No. column contains the number of the register, which will vary in accordance with the particular requirements for the appliance. The Definition column defines the type of operating data stored in that register. The Dimension column provides the units of measurement of the operating data. The Read/Write column indicates whether the asset management server reads values from that register ("R"), writes values into the register ("W"), or both reads values from, and writes value into, the register ("R/W").

In the illustrated embodiment, the controller 160 is configured to periodically send the asset management server 105, via the network interface 170 and the network 107, values measured by the local control system, including: one or more sensed temperatures (e.g., an air temperature, one or more evaporator temperatures 120 (e.g., the maximum temperature of the refrigerant at the outlet of the evaporator during a freeze step of a previous ice batch production cycle, a temperature of the refrigerant at the outlet of the evaporator at a predefined point in time during a freeze step of a previous ice batch production cycle, a minimum temperature of the refrigerant at the outlet of the evaporator during a freeze step of a previous ice batch production cycle, a maximum temperature of the refrigerant at the outlet of the evaporator during a harvest step of a previous ice batch production cycle), a temperature of the water in the sump 130, and/or a temperature of the supply water at the water inlet), one or more sensed refrigerant pressures (e.g., a sensed refrigerant pressure on the high pressure side of the compressor 112 (e.g., the maximum high side pressure during a freeze step of a previous ice batch production cycle, a high side pressure at a predefined point in time during a freeze step of a previous ice batch production cycle, a minimum high side pressure during a freeze step of a previous ice batch production cycle, a maximum high side pressure during a harvest step of a previous ice batch production cycle) or a sensed pressure of the refrigerant pressure on the low pressure side of the compressor (e.g., the maximum low side pressure during a freeze step of a previous ice batch production cycle, a low side pressure at a predefined point in time during a freeze step of a previous ice batch production cycle, a minimum low side pressure during a freeze step of a previous ice batch production cycle, a maximum low side pressure during a harvest step of a previous ice batch production cycle), a measured run time (e.g., amount of run time in the last day, week, and/or month), a measured water usage (e.g., amount of water consumed in the last day, week, and/or month), a measured energy usage (e.g., amount of energy consumed in the last day, week, and/or month), a measured ice production (e.g., amount of ice produced in the last day, week, and/or month), a measured freeze step duration (e.g., the amount of time taken to conduct the freeze step of the previous completed ice batch production cycle, the amount of time taken to conduct each of the previous predefined number of (e.g., five) freeze cycles, an average of the amount of time taken to conduct each of the previous predefined number of (e.g., five) freeze cycles), a measured harvest step duration (e.g., the amount of time taken to conduct the harvest step of the previous completed ice batch production cycle, the amount of time taken to conduct each of the previous predefined number of (e.g., five) harvest cycles, an average of the amount of time taken to conduct each of the previous predefined number of (e.g., five) harvest cycles). The controller is also configured to periodically send the asset management server 105, via the network interface 170 and the network 107, indications of certain control settings and statuses, including: the current operating mode setting, the current set point values, and the status of any alarms (e.g., whether any alarm is active to indicate a fault). An appliance may "periodically" send or publish operating data to a remote server either at specific intervals or at any time an operating value changes. In certain embodiments, an appliance publishes operating data at specific times, but only publishes parameter values that have changed. In one or more embodiments, an appliance can publish alarm indications immediately and publish all other operating data on a predefined time interval schedule.

The local controller 160 can also receive various commands from the asset management server 105, via the client-server network 107 and the network interface 170. In one or more embodiments, the network interface 170 is configured to pass a "change control parameter command" from the remote asset management server 105 to the controller 160, and in response to receiving the change control parameter command, the controller is configured to change one or more control parameters by which it directs the appliance 103 to perform an appliance function such as making ice. Change control parameter commands can be used to change various types of control parameters within the scope of the disclosure. For example, in one or more embodiments, the change control parameter command can cause the controller 160 to change particular set point or limit control values, e.g., water levels, ice thickness values, temperature set point values, alarm limits, etc. In certain embodiments, the change control parameter command is configured to cause the controller to change an operating mode of the appliance 103 (e.g., from a primary operating mode to a secondary operating mode or vice versa). Hence, in certain embodiments in which the ice maker 103 stores local control settings for a predefined set of operating modes, the change control parameter command causes the controller 160 to write new values to the registers stored in the memory 109 which set the current operating mode of the appliance 103. In other embodiments, the change control parameter command can cause the controller 160 to change operating modes by changing one or more predefined control settings such as set point values or limit values stored in the memory 109. Table II below is an exemplary embodiment listing a sampling of control parameters that can be written over by a change operating parameter command sent from the asset management server:

TABLE II

| REGISTER NO. | DEFINITION | DIMENSION | NOTE |
|---|---|---|---|
| 101 | Adjust the time for a clean reminder alarm | Weeks | R/W |
| 102 | Adjust the time for reverse fan condensing cleaning | Minutes | R/W |
| 103 | Adjusts the ice quantity for the water filter reminder alarm | Gallons | R/W |
| 104 | Turn on or off automatic run at startup | Flag | R/W |
| 105 | Start a manual clean | N/A | W |
| 105 | Reset alarms and their counters if in standby | N/A | W |
| 106 | Normal operating mode on | binary | R/W |
| 107 | Safe operating mode on | binary | R/W |
| 108 | High efficiency operating mode on | binary | R/W |
| 109 | Locked mode on | binary | R/W |

Referring again to FIG. 1, exemplary methods of using the asset management system 101 for the ice makers 103 distributed throughout the geographic area A, will now be briefly described. As set forth above, a connection is first established between each of the ice makers 103 and the asset management server 105, e.g., using a registration system. The asset management server 105 will typically store in memory 109 a location for each ice maker 103 at the time the connection is made. So for an ice maker 103 comprising a GPS receiver 168, after the connection is established, the controller 160 sends information about the GPS location signal to the remote asset management server via the network interface 170 and network 107. Where no GPS location information is available to the asset management server 105, the server can obtain the location of the ice maker using another self-authenticating method, such as network-derived location estimation. So for example, where the network interface 170 comprises a cellular network transceiver, the asset management server 105 can use cellular network triangulation to estimate the location of the ice maker 103 based on the network data included in the signals sent from the ice maker to the server. And where the network interface comprises a Wi-Fi transceiver, the asset management server uses any of various commercially available Wi-Fi positioning systems to estimate the location of the ice maker 103 based on the network data included in the signals sent from the ice maker to the server. Where a self-authenticating location for the ice maker cannot be reliably established, the server can use an address provided during device registration to determine the location for the ice maker 103.

Regardless of the method used to determine the location for the appliance, in one or more embodiments, the server stores the location in memory 109 in a standardized format. For example, the memory 109 can store each location in the form of two-dimensional coordinate according to a known geographical coordinate system or the specified coordinates of a projected coordinate system. In some cases, it may be necessary to transform the original location source data (discussed above) into the standard format. There are numerous commercially available tools for transforming non-standardized location data, such as address data, into standardized formats, and any of these tools may be used without departing from the scope of the disclosure. Suitably the standardized location format used in the memory 109 is a recognized format of a commercially available Geographic Information System (GIS). This allows the location data for the appliances 103 to be treated as a point map that may be used as a layer in the GIS software. The appliance location data can thus be combined with other layers of GIS data. As will become apparent, it is contemplated that the asset management server 105 will use the appliance location data stored in the memory 109 in combination with GIS data that describes the shapes of various predefined regions such as municipal districts, utility districts, tribal lands, cities, counties, states, and provinces within the geographic area A of the asset management system 101. An example of a source for this type of GIS data is the Topologically Integrated Geographic Encoding and Referencing (TIGER) shapefile data available in the public domain from the U.S. Government. Other GIS data sources defining the shapes and locations of various regions within geographic areas are also known. By layering the appliance location data onto regional shapefile data, the asset management server 105 can determine which of the appliances are located within a given region of interest.

Figure 5:
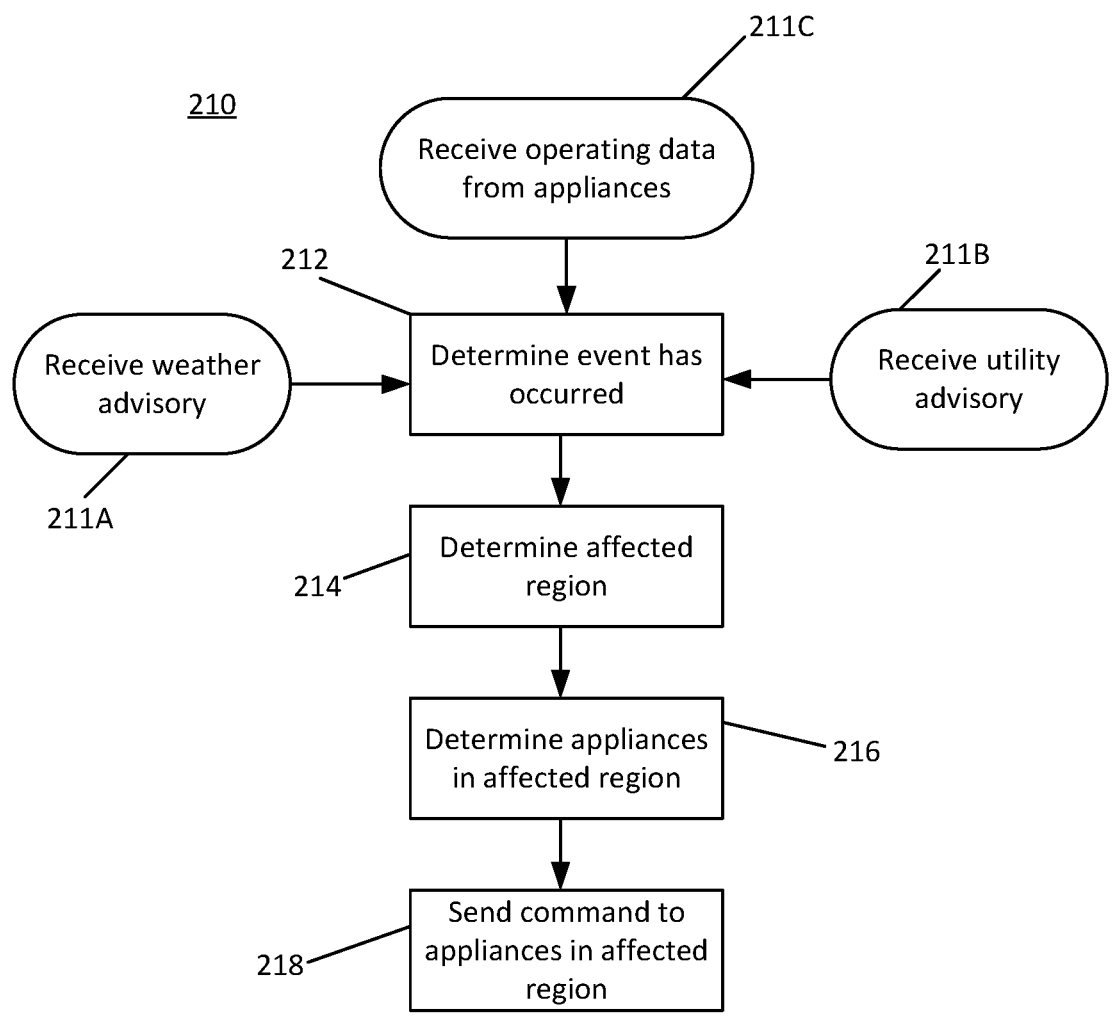
FIG. 5 is a flow chart illustrating the steps of a method of using the asset management system for regional control of the appliances.

Referring to FIG. 5, an exemplary method of using the asset management system 101 for regional control of the appliances 103 is generally indicated at reference number 210. After establishing the connection between the server 105 and the appliances 103 and storing indications of the locations of the appliances in the memory 109, the asset management server may determine that an event has occurred in a specified region R of the geographic area (step 212). The event determination made in step 212 can comprise receiving an indication of a weather event in the specified region R (starting point 211A). For example, the server 105 may receive an indication from a weather service of a flood warning, drought warning, or other weather warning indicating that a localized weather event is occurring in the specified region. Alternatively, as shown at starting point 211B, the event determination step 212 step may proceed from the server 105 receiving an indication of a utility advisory affecting a specified region R. For instance, the server 105 can receive an indication that a water advisory such as a boil order is in effect within a given geographic area, that local energy or water use regulations will change, that there is a power or water shortage in a given geographic area, etc. Furthermore, as shown at 211C, the event determination step 212 may be responsive to the identification of a significant localized change in performance in a specific region R.

After determining that an event has occurred in step 212, the asset management server 105 next determines the geographic boundaries of the region of interest at step 214. In general, step 214 comprises determining the geographic boundaries of the perimeter or border of the location of interest. Typically, a descriptive indication of the geographic region at issue will be present in the alert or notification by which the server 105 determines that an event has occurred in step 212. As explained above, the server 105 may access GIS data which defines the geographic borders of known geographic regions. Hence, in one or more embodiments, step 214 comprises querying an available GIS database for the borders of the specified region R. In certain embodiments, an administrator may be responsible to define the boundaries of a specified region after the system 101 is notified of an event in step 212. For example, the system 101 can include software that allows the administrator to use display tools to draw a representative boundary line on a digital map of the geographic area A to specify the affected region R. When the event is determined based on performance data of the appliances 103 in the asset management system 101 (starting point 211C), the asset management server 105 can, in some cases, use a statistical analysis of the performance data to determine the boundaries of the region of interest R.

After determining that an event has occurred in step 212 and determining the boundaries of the affected region in step 214, in step 216, the asset management server 105 next determines which of the appliances 103 are located in the specified region R. As explained above, the asset management server 105 can store in the memory 109 point locations for each of the appliances 103 in the asset management system 101. By combining/comparing this data with the geographic boundaries determined in step 214, the asset management server 105 can determine which of the appliances 103 reside within the boundaries of the specified region R and which of the appliances reside outside of the specified region.

After determining which of the appliances reside within the specified region R, in step 218, the server 105 takes action to address the event in question. In FIG. 5, the corrective action taken comprises sending change control parameter commands over the network 107 to each of the appliances 103 in the specified region R. As explained above, in response to receiving the change control parameter command, the local controller 105 of each ice maker 103 in the specified region R is configured to change a control parameter for the respective ice maker appliance. So for example, in one or more embodiments, the change control parameter command is configured to cause each local controller to change an operating mode of the respective refrigeration appliance. For instance, the change control parameter command can be configured to cause each controller to change from a normal operating mode to one of (i) a safe operating mode (e.g., in which the local controller causes the ice maker to purge a greater amount of water from the ice maker) and (ii) a high efficiency mode (e.g., in which the local controller operates the refrigeration appliance with less energy consumption), or vice versa. In certain embodiments, the change control parameter command can be configured to change a control setting such as a set point value, a limit value, or the like. In response to receiving the change control parameter commands, each of the local controllers 160 of the ice makers 103 in the specified region R change the control parameter as specified in the command, which changes how the controller operates the appliance in a way that is responsive to the event in question.

To provide one practical example of how the method 210 might be used, imagine a situation in which a drought has led to a substantial increase in water hardness within a localized region. In that scenario, the ice makers in the region in question will be at significantly elevated risk of failure if no corrective action is taken (e.g., if the ice makers continue to operate as normal with control settings tailored to supply water with lower levels of dissolved hard minerals in solution). The system 101, enables a remote administrator to recognize that the drought has occurred (step 212), specify the geographic region R affected by the drought (step 214), determine which of the appliances are located within the specified geographic region (step 216), and push a command to all of the ice makers within the specified geographic region (step 218) which switches the ice makers from operating in the normal operating mode to a safe operating mode in which more water is purged from the ice maker. This maintains a lower level of hard minerals in the sump water so that the ice makers are less likely to fail.

To provide another practical example, imagine a situation in which a state or county issues new energy efficiency rules that limit the allowable amount of energy consumed by ice makers to be less than the amount of energy consumed by the ice makers 103 operating in the normal operating mode. In that scenario, all of the ice makers in the region will be in violation if no corrective action is taken. The system 101, enables a centralized administrator to recognize that the rule change has occurred (step 212), specify the geographic region R affected by the rule change (step 214), determine which of the appliances are located within the specified geographic region (step 216), and push a command to all of the ice makers within the specified geographic region (step 218), which switches the ice makers from operating in the normal operating mode to a high efficiency operating mode in which the ice maker consumes an amount of energy in compliance with the new rules.

In yet another practical example, imagine a situation in which a local water utility issues a full boil order. In that scenario, it would be unsafe to consume ice produced by the municipal water in affected region. The system 101 enables a centralized administrator to recognize that the boil order has been issued (step 212), specify the geographic region R affected by the boil order (step 214), determine which of the appliances are located within the specified geographic region (step 216), and push a command to all of the ice makers within the specified geographic region (step 218) which switches the ice makers from operating in the normal operating mode to a locked mode that prevents the ice makers from being used to make ice until the boil order is lifted. When the boil order is lifted, the server 105 can issue a second change control parameter command to the ice makers which switches them from the locked mode back to the normal mode of operation.

In still another example, the asset management system administrator could partner with local utilities in an effort to reduce energy use in a given region. For example, the asset management system could enable appliance owners to opt into local programs in which a utility company dictates when appliances should be switched from the normal operating mode to the high efficiency operating, such as in the situation when available grid power is relatively low or scarce. In that event, the local power utility gives notice to the system administrator, who in turn pushes a command to all of the appliances registered to the local program within the specified geographic region to switch the appliances from operating in the normal operating mode to the high efficiency mode. It is conceivable that this type of program could be further enhanced by providing automated mechanisms for increasing the capacity of the appliances in the program when that particular appliance is experiencing a high demand for ice. For example, as explained above, the asset management server 105 is configured to receive operating data from the ice makers 103 which includes ice level information. If the asset management server 105 determines that one of the ice makers that has been switched to the high efficiency mode has an ice level below a threshold at a time when ice demand is high, the asset management server 105 can send an individual command to that ice maker temporarily changing it from the high efficiency mode back to the normal mode until demand for ice is satisfied.

Although the illustrated embodiment of the method 210 addresses the localized event by issuing direct commands to the local controllers 160 of the ice makers 103 thereby causing the controllers to change local control parameters, it is contemplated that the system 101 can take action in response to localized events in other ways. For example, in one or more embodiments, the memory 109 stores contact information (e.g., cell phone numbers and/or email addresses) for the operator of each of the appliances 103 that is registered to the asset management system 101 (e.g., the registration process can prompt to operator to furnish this information). Instead of sending a change control parameter command in step 218, the server 105 can instead push notifications to the operators using their registered points of contact. The notifications could warn the operator of the localized event determined in step 212 and/or suggest action that the operators could take to adjust the ice makers in a way that addresses the event.

Figure 6:
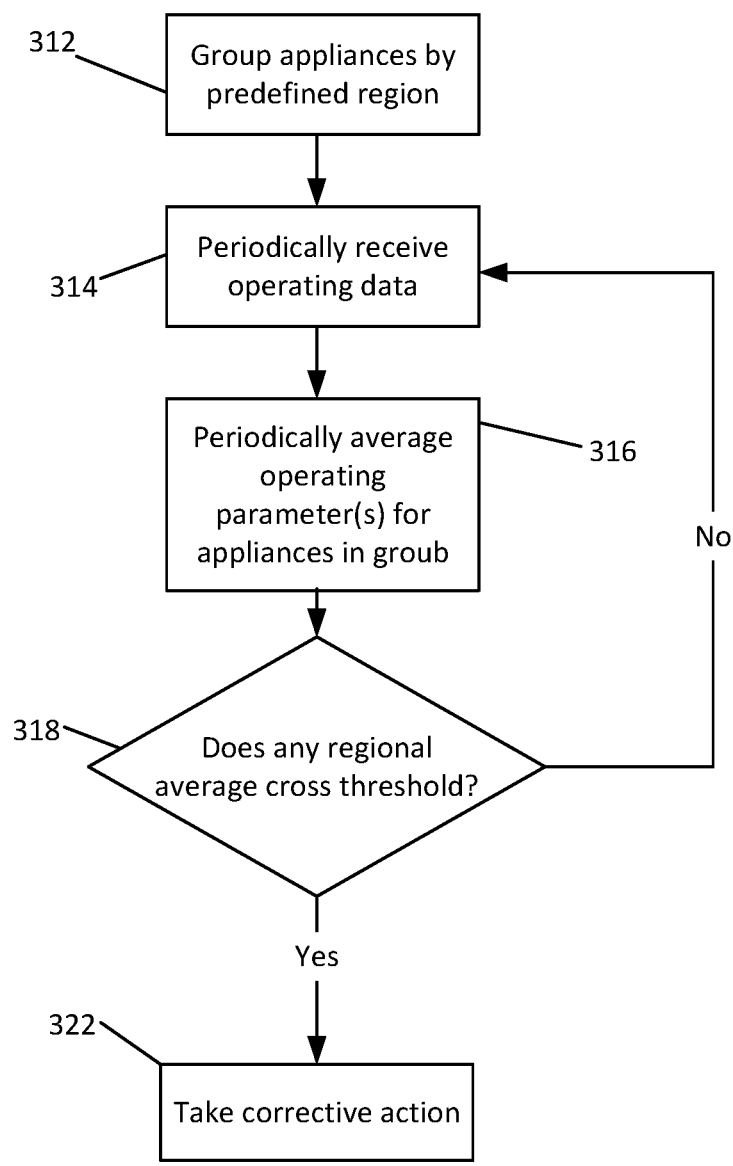
FIG. 6 is a flow chart illustrating the steps and decision point of another method of using the asset management system for regional control of the appliances.

Referring to FIG. 6, another exemplary method of using the asset management system 101 is generally indicated at reference number 310. The method 310 provides a method by which the system 101 can determine when localized events are occurring so that corrective action may be taken, for example, using the method 210 discussed above. Initially, after establishing the connection between the server 105 and the appliances 103 and storing indications of the locations of the appliances in the memory 109, at step 312, the server groups the appliances 103 registered to the asset management system 101 together by predefined regions of the geographic area A, based on the locations stored in the memory. The server 105 may base the boundaries of the predefined regions on third party GIS data which defines the contiguous geographic borders of known geographic regions (e.g., municipal districts, utility districts, tribal lands, cities, counties, states, and provinces within the geographic area A). After determining the boundaries of the predefined regions, the server 105 next determines which of the appliances 103 are located in the specified region R. As explained above, the asset management server 105 can store in the memory 109 point locations for each of the appliances 103 in the asset management system 101. By combining/comparing this data with the geographic boundaries of the predefined regions, the asset management server 105 can determine which of the appliances 103 reside within the boundaries of the various regions.

At step 314, the asset management server 105 periodically receives operating data from the ice makers 103 in the asset management system 101. For example, as described above, each of the ice makers 103 is configured to periodically send the asset management server 105, via the network interface 170 and the network 107, operating parameter values measured by the local control system and indications of certain control settings and statuses. In step 316, the asset management server 105 evaluates the operating data from the ice makers 103. More particularly, the asset management server 105 periodically averages the current values of selected operating data for all of the ice makers 103 located in each predefined region. The server 105 is configured to recognize when significant changes are visible in the data for any of the predefined regions. In the illustrated embodiment, the memory 109 stores threshold parameter values for each of the parameters of interest. At decision point 318, the server 105 compares the average parameter value for each predefined region to the corresponding threshold parameter values. If an average value crosses a threshold value, the server 105 determines that a localized event may be occurring and automatically takes action to address the event (step 322). For example, in one or more embodiments, the server 105 sends an alert (e.g., pushes a text message or email message) to an administrative user of the asset management server 105 notifying the user of the potential event. This allows the administrator to evaluate the evidence for the event before taking more significant corrective action such as pushing notifications to the operators of each of the appliances in the region or sending change control parameter commands to each of the appliances to automatically adjust for the event as described above. In other embodiments, instead of notifying the administrator first, the server 105 can be configured to push notifications directly to the individual operators or send change control parameter commands directly to the appliances without seeking prior approval.

Figure 7:
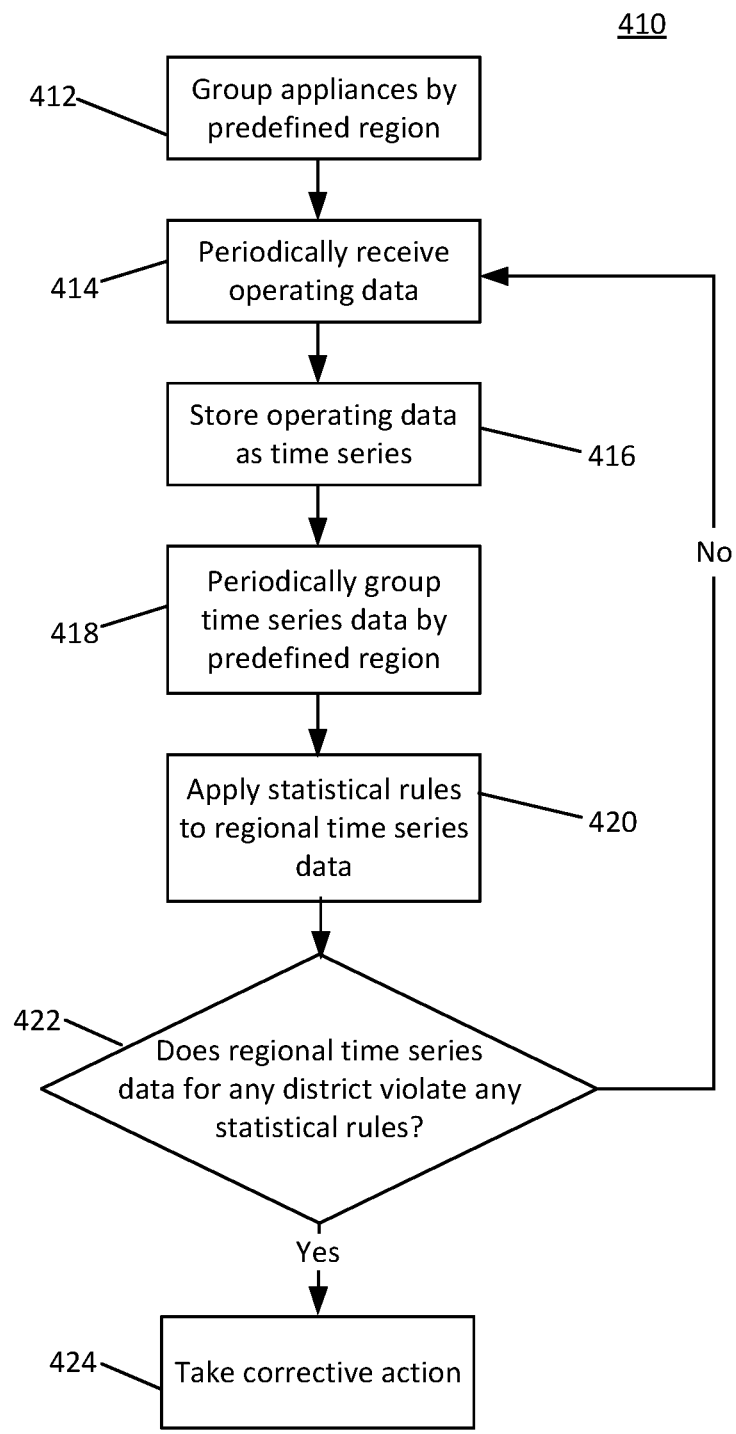
FIG. 7 is a flow chart illustrating the steps and decision point of another method of using the asset management system for regional control of the appliances.

Referring to FIG. 7, another exemplary method of using the asset management system 101 is generally indicated at reference number 410. The method 410 provides another method by which the system 101 can determine when localized events are occurring so that corrective action may be taken, for example, using the method 210 discussed above. Initially, after establishing the connection between the server 105 and the appliances 103 and storing indications of the locations of the appliances in the memory 109, at step 412, the server groups the appliances 103 registered to the asset management system 101 together by predefined regions of the geographic area A, based on the locations stored in the memory. The server 105 may base the boundaries of the predefined regions on third party GIS data which defines the contiguous geographic borders of known geographic regions (e.g., municipal districts, utility districts, tribal lands, cities, counties, states, and provinces within the geographic area A). After determining the boundaries of the predefined regions, the server 105 next determines which of the appliances 103 are located in the specified region R. As explained above, the asset management server 105 can store in the memory 109 point locations for each of the appliances 103 in the asset management system 101. By combining/comparing this data with the geographic boundaries of the predefined regions, the asset management server 105 can determine which of the appliances 103 reside within the boundaries of the various regions.

At step 414, the asset management server 105 periodically receives operating data from the ice makers 103 in the asset management system 101. For example, as described above, each of the ice makers 103 is configured to periodically send the asset management server 105, via the network interface 170 and the network 107, operating parameter values measured by the local control system and indications of certain control settings and statuses.

In steps 416, 418, 420, the asset management server 105 evaluates the operating data from the ice makers 103. More particularly, in step 416, the asset management server 105 stores the control parameter values as a time series, and in step 418, the asset management server groups the time series together by predefined regions. At step 420, the asset management server analyzes the grouped time series data to determine if any of the predefined regions shows anomalous performance. For example, in one embodiment, the asset management server calculates a moving average for grouped time series of the parameters of interest and determines whether any of the moving averages is outside a normal range (e.g., crosses a predefined threshold for the parameter). In certain embodiments, the normal ranges can be determined based on long term averages of the time series across the geographic area A or within each of the respective regions. Other methods of analyzing the time series data for each predefined region are also possible without departing from the scope of the disclosure. For example, in one or more embodiments, the server 105 can be configured to use statistical algorithms to identify trends in the data for each of the predefined regions, e.g., a Mann Kendall trend test.

As indicated by decision point 422, if the analysis of the time series shows a localized anomaly in the operating parameter data, the server 105 determines that an event may be occurring in the region and automatically takes action to address the event (step 424). For example, in one or more embodiments, the server 105 sends an alert (e.g., pushes a text message or email message) to an administrative user notifying the user of the potential event. This allows the administrator to evaluate the evidence for the event before taking more significant corrective action such as pushing notifications to the operators of each of the appliances in the region or sending change control parameter commands to each of the appliances to automatically adjust for the event as described above. In other embodiments, instead of notifying the administrator first, the server 105 can be configured to push notifications directly to the individual operators or send change control parameter commands directly to the appliances without seeking prior approval.

In one practical example of the methods 310 and 410, the server 105 can determine that a localized event has occurred based on a change in time to complete a step of the ice batch production cycles among a subset of ice makers in a predefined region of the geographic area. An anomalous change in this parameter that is localized could be indicative of a significant change in water quality localized at the affected region. Thus, either with or without prior administrative approval, the system 101 can take action to address the likely increase in water hardness by switching the ice makers in the specified region (and only those affected ice makers) to a safe mode of operation.

In another practical example of the methods 310, 410, the server can determine that a localized event has occurred based on a significant change in the amount of energy being consumed by a subset of ice makers in one of the predefined regions of the geographic area A. An anomalous change in this parameter that is localized to a particular region could indicate a change in air quality, ambient temperatures, or water quality, which might be addressed by switching the ice makers in the specified region (and only those affected ice makers) to a safe mode of operation or changing another pertinent control parameter of the affected ice makers.

Other ways of evaluating the operating data sent from the appliances 103 to the server 105 may be used without departing from the scope of the disclosure. For example, in one or more embodiments, particularly where a statistically significant number of appliances are registered to the asset management system 101 within a geographic area A, the server 105 can be configured to identify a hot spot region in which one or more control parameter values of the operating data from a cluster of the refrigeration appliances in the region is/are inconsistent with the same value(s) of refrigeration appliances outside the localized hot spot. In this type of emerging hot spot analysis, the specified region R is not predefined and thus not limited to existing geographic boundaries for places like cities, counties, utility districts, and the like. Rather, the server 105 is configured to use the operating parameter data in combination with the known information about the locations of the sources of the operating data to automatically determine the geographic boundaries of the hot spot location. One tool for identifying geographic hot spots based on time series data from geographically distributed sources is the Emerging Hot Spot Analysis tool on the ArcGIS Pro software, available from ESRI. These types of advanced GIS tools are used in other contexts to identify trends in the clustering of values in space-time. The ArcGIS Emerging Hot Spot Analysis tool generates a space-time cube by assigning point location data to space-time bins arranged conceptually on a three-dimensional coordinate system in which x-z planes represent two dimensional space and the vertical y axis represents time. The space-time data are evaluated using a space-time statistical algorithm such as the Getis-Ord Gi* algorithm to identify clustered locations within the space-time cube where anomalous events are occurring. Thus, the system can provide even more dynamic analysis of the operating data to identify both the anomalous event and the spatial boundaries of the region R in which the anomalous operating data are clustered.

As explained above, the present disclosure is not limited to asset management systems for ice makers. Other types of refrigeration appliances, cooking appliances, cleaning appliances, and water-using appliances may be controlled and monitored on a geographic basis using the methods and systems described above. Examples of refrigeration appliances include medical freezers and self-contained commercial refrigerators.

To provide an additional example to demonstrate this point, refrigerators and freezers are known to employ condenser cleaning systems (e.g., reversing condenser fan systems) that periodically clean the condenser of debris in order to maintain the performance of the appliance. When a localized event occurs that causes a significant change in air quality, the asset management server can perform the method 210 to change control parameters of the refrigerators and freezers in the affected region R to increase the frequency and/or intensity with which the appliance conducts the condenser cleaning operations. For example, certain refrigerators or freezers might be preprogrammed with secondary safe modes of operation that define higher frequency or higher intensity condenser cleaning controls. In these cases, the asset management system could address the localized event in the region by issuing a change control parameter command that changes the refrigerators and freezers from operating in the normal mode of operation to the safe mode. Similarly, if there is a localized change in energy regulations or a power shortage, the asset management server can perform the method 210 to change one or more control parameters that affect the energy usage of the refrigerator or freezer. For instance, the asset management server can issue change control parameter commands that lower the speed of any variable speed compressor or fan of the appliances in the affected region. Additionally, the asset management server could issue change control parameter commands that disable higher energy-consuming features such as quick drawdown modes, etc. Certain refrigerators or freezers might be preprogrammed with secondary high efficiency modes of operation that lower speed settings and/or that disable higher energy consuming features of the appliance. In these cases, the asset management system could address the localized event in the region by issuing a change control parameter command that changes the refrigerators and freezers from operating in the normal mode of operation to the high efficiency mode. It can also be appreciated that operating data from the refrigerators and freezers could be collected and evaluated on a regional basis using the methods 310, 410 so that regional events could be identified and addressed. For instance, if the operating data shows a localized increase in the rate of cooling, the asset management system could take action to identify and address the cause (e.g., elevated rates of condenser fouling, etc.).

As will be appreciated by one skilled in the art, aspects of the embodiments disclosed herein may be embodied as a system, method, computer program product or any combination thereof. Accordingly, embodiments of the disclosure may take the form of an entire hardware embodiment, an entire software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in any tangible medium having computer usable program code embodied in the medium.

Aspects of the disclosure may be described in the general context of computer-executable or processor-executable instructions, such as program modules, being executed by a computer or processor. Generally, program modules include routines, programs, objects, components, data structures, etc. that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present disclosure may be written in any combination of one or more programming languages, including, but not limited to, an object oriented programming language such as Java, Smalltalk, C++, C# or the like and conventional procedural programming languages, such as the "C" programming language or similar programming languages. The program code may execute entirely on the portable electronic device, partly on the portable electronic device or refrigeration appliance, as a stand-alone software package, partly on the portable electronic device and partly on a remote computer, or entirely on a remote computer or server. In the latter scenario, the remote computer may be connected to the portable electronic device through any type of network, including a local area network (LAN) or a wide area network (WAN), or the connection may be made to an external computer (for example, through the Internet using an Internet Service Provider).

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A method of managing a plurality of refrigeration appliances distributed throughout a geographic area, the method comprising:
    establishing a connection between each refrigeration appliance and a remote asset management server on a client-server network;
    identifying by the asset management server that an event has occurred in a specified region of the geographic area;
    determining by the asset management server a subset of the plurality of refrigeration appliances located within the specified region of the geographic area, wherein the subset is more than one refrigeration appliance;
    sending by the asset management server a change control parameter command to each of the subset of refrigeration appliances over the client-server network, the change control parameter command being configured to cause a local controller of each of the subset of refrigeration appliances to change a control parameter for the respective refrigeration appliance;
    receiving by each of the subset of refrigeration appliances the change control parameter command;
    automatically changing by each of the subset of refrigeration appliances the control parameter in response to said receiving; and
    operating each of the subset of refrigeration appliances in accordance with the changed control parameter after said automatically changing.

2. The method of claim 1, wherein the change control parameter command is configured to cause each local controller to change an operating mode of the respective refrigeration appliance.

3. The method of claim 2, wherein the change control parameter command is configured to cause each controller to change from a normal mode to one of (i) a safe mode and (ii) a high efficiency mode.

4. The method of claim 2, wherein the plurality of refrigeration appliances are ice makers and the change control parameter command is configured to cause each controller to change from a normal ice making mode to a safe ice making mode in which the local controller causes the ice maker to purge a greater amount of water from the ice maker.

5. The method of claim 1, wherein identifying that the event has occurred comprises receiving an indication of a weather event in the specified region.

6. The method of claim 1, wherein identifying that the event has occurred comprises receiving an indication of a utility advisory in the specified region.

7. The method of claim 1, further comprising receiving by the asset management server operating data from each of the plurality of refrigeration appliances.

8. The method of claim 7, further comprising evaluating the operating data from each of the plurality of refrigeration appliances, wherein identifying that the event has occurred comprises recognizing a localized change in the operating data in the specified region.

9. The method of claim 1, wherein said determining by the asset management server the subset of the plurality of refrigeration appliances located within the specified region of the geographic area comprises determining a location for each of the refrigeration appliances based on one or more of (i) a registered location stored in memory, (ii) network-derived location estimation, and (iii) GPS data sent by the refrigeration appliance to the asset management server over the client-server network.

10. The method of claim 1, wherein the change control parameter command is configured to cause each local controller to change from a normal operating mode to a high efficiency mode in which the local controller operates the refrigeration appliance with less energy consumption.

11. A method of managing a plurality of refrigeration appliances distributed throughout a geographic area, the method comprising:
   establishing a connection between each refrigeration appliance and a remote asset management server on a client-server network;
   storing in a memory associated with the asset management server a location of each of the refrigeration appliances in the geographic area;
   receiving at the asset management server operating data from the plurality of refrigeration appliances; and
   evaluating the operating data from each of the plurality of refrigeration appliances within the geographic area to determine whether a localized event has occurred in a region of the geographic area;
   wherein the refrigeration appliances are ice makers and the operating data includes a time parameter representative of time to complete a step of an ice batch production cycle, said receiving comprising receiving at the asset management server from the ice makers via the client-server network the time parameter, the method further comprising determining that a localized event has occurred based on a change in time to complete the step of the ice batch production cycle among a subset of ice makers in a region of the geographic area; wherein the subset of ice makers is more than one ice maker.

12. The method of claim 11, wherein the operating data includes an energy consumption parameter representative of an amount of energy consumed by the respective refrigeration appliance, the method further comprising determining that a localized event has occurred based on a change in the amount of energy consumed among a subset of refrigeration appliances in a region of the geographic area.

13. The method of claim 11, wherein said receiving at the asset management server operating data from the plurality of refrigeration appliances comprises periodically receiving a parameter value from each of the plurality of refrigeration appliances.

14. The method of claim 13, wherein said evaluating the operating data from each of the plurality of refrigeration appliances comprises storing the control parameter values as a time series and determining whether the localized event has occurred based on the time series.

15. The method of claim 14, wherein said determining whether a localized event has occurred based on the time series comprises periodically calculating a moving average of the time series and determining when the moving average is outside of a normal range for the control parameter value.

16. The method of claim 15, further comprising determining the normal range for the control parameter value based on a long term average of the time series.

17. The method of claim 11, further comprising assigning each of the plurality of refrigeration appliances to one of a plurality of predefined regions of the geographic area based on the determined location of each of the refrigeration appliances in the geographic area.

18. The method of claim 17, wherein said evaluating the operating data from each of the plurality of refrigeration appliances comprises grouping together the operating data from the refrigeration appliances in each of the predefined regions of interest.

19. The method of claim 18, wherein said evaluating the operating data from each of the plurality of refrigeration appliances comprises determining whether a parameter of the grouped operating data for each predefined region of interest crosses a predetermined threshold parameter.

* * * * *